United States Patent
Naseri et al.

(10) Patent No.: US 10,693,739 B1
(45) Date of Patent: Jun. 23, 2020

(54) NETWORK DESIGN PLATFORM

(71) Applicant: Accenture Global Solutions Limited, Dublin (IE)

(72) Inventors: Hassan Naseri, Helsinki (FI); Joshua Intriligator, New York, NY (US); Jason P. Webb, Overland Park, KS (US); Ben Agai, Fairfax, VA (US); Sachin Kumar Chauhan, Espoo (FI)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/559,384

(22) Filed: Sep. 3, 2019

Related U.S. Application Data

(60) Provisional application No. 62/853,986, filed on May 29, 2019.

(51) Int. Cl.
*H04L 12/24* (2006.01)
*G06F 16/901* (2019.01)
*G06F 16/29* (2019.01)
*G06N 20/00* (2019.01)

(52) U.S. Cl.
CPC ............ *H04L 41/145* (2013.01); *G06F 16/29* (2019.01); *G06F 16/9024* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,771,966 B1* | 8/2004 | Chow | ............ | H04W 16/18 455/446 |
| 7,606,938 B2* | 10/2009 | Roese | ............ | G01S 5/02 709/242 |
| 9,917,739 B2* | 3/2018 | Levchuk | ............ | G06Q 50/01 |
| 10,163,315 B2* | 12/2018 | Staszel | ............ | G08B 21/02 |
| 10,291,478 B1* | 5/2019 | Hosamani | ............ | H04L 41/0873 |
| 2014/0288995 A1* | 9/2014 | Huff | ............ | G06Q 10/0635 705/7.28 |

(Continued)

OTHER PUBLICATIONS

"PageRank", Wikipedia: The Free Encyclopedia, Wikimedia Foundation, Inc., https://en.wikipedia.org/wiki/PageRank [retrieved Sep. 3, 2019].

(Continued)

*Primary Examiner* — Michael J Moore, Jr.
(74) *Attorney, Agent, or Firm* — Harrity & Harrity, LLP

(57) ABSTRACT

A device may obtain incomplete geospatial coordinate data associated with a telecommunications network. The device may generate a network graph representation of the telecommunications network based on the incomplete geospatial coordinate data. The device may determine, for candidate sites, a candidate site score based on a quantity of candidate segments to connect the candidate site to a candidate hub. The device may determine, for candidate segments, a candidate segment score based on a quantity of candidate sites that connect to a candidate hub via the candidate segment. The device may determine a prioritization of the candidate segments based on the candidate site scores and the candidate segment scores. The device may generate a recommendation for selecting or ordering the candidate segments. The device may provide the recommendation for display via a user interface.

25 Claims, 9 Drawing Sheets

(56) References Cited

U.S. PATENT DOCUMENTS

| | | | | |
|---|---|---|---|---|
| 2018/0107216 | A1* | 4/2018 | Beaurepaire | B60W 50/08 |
| 2018/0329958 | A1* | 11/2018 | Choudhury | G06F 16/24568 |
| 2018/0337935 | A1* | 11/2018 | Marwah | H04L 63/1425 |
| 2019/0347589 | A1* | 11/2019 | Sullivan | G06F 3/04817 |
| 2019/0384861 | A1* | 12/2019 | Ghoting | G06F 16/24578 |

OTHER PUBLICATIONS

Brin et al., "The anatomy of a large-scale hypertextual Web search engine," Computer Networks and ISDN Systems, vol. 30, 1998, pp. 107-117.

* cited by examiner

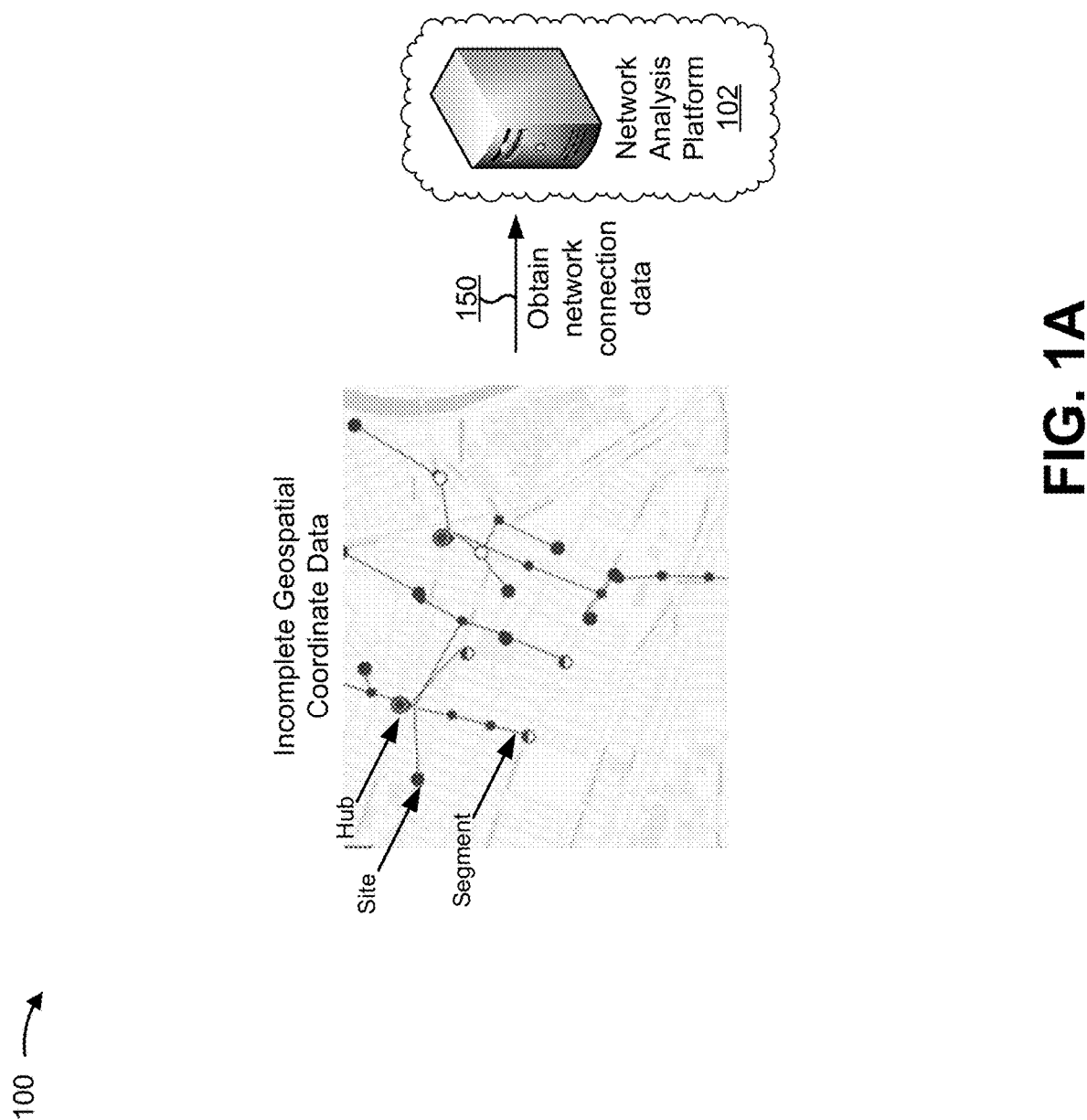

500 ─▶

510 — Obtaining network connection data associated with a point-to-point hub-and-spoke architecture network, wherein the network connection data includes first data identifying candidate segments of the point-to-point hub-and-spoke architecture network and second data identifying candidate sites of the point-to-point hub-and-spoke architecture network 520 — Generating a network graph representation of the point-to-point hub-and-spoke architecture network based on the network connection data, wherein the network graph representation includes edges corresponding to the candidate segments and nodes corresponding to the candidate sites 530 — Assigning candidate site scores to the candidate sites based on a quantity of candidate segments associated with the candidate sites 540 — Assigning, for each candidate segment, a segment score based on a quantity of candidate sites associated with the candidate segment 550 — Determining a prioritization based on the candidate site scores and the segment scores 560 — Generating a recommendation for selecting or ordering the candidate segments based on the prioritization 570 — Providing the recommendation for display via a user interface

FIG. 5

NETWORK DESIGN PLATFORM

RELATED APPLICATION(S)

This application claims priority under 35 U.S.C. § 119 to U.S. Provisional Patent Application No. 62/853,986, filed on May 29, 2019, and entitled "NETWORK DESIGN," the content of which is incorporated by reference herein in its entirety.

BACKGROUND

A telecommunications network may be deployed to provide telecommunications services to user devices operating in a service area of the telecommunications network. A backend of the telecommunications network may be defined by a set of fixed sites or hubs and a set of segments connecting, at a set of segments, the set of fixed sites or hubs. For example, base stations may be deployed at different locations (e.g., sites or hubs) to provide access connections to user devices. In this case, the base stations may be interconnected to each other and/or to a network backend using a set of backhauling connections (e.g., segments). The backhauling connections may be wireline connections, wireless connections, and/or the like. With increasing quantities of user devices being used, increasingly complex and interconnected telecommunications networks may be deployed to provide telecommunications services to user devices in a service area.

SUMMARY

According to some implementations, a device may include one or more memories; and one or more processors, communicatively coupled to the one or more memories, configured to: obtain incomplete geospatial coordinate data associated with a telecommunications network, the incomplete geospatial coordinate data includes first data identifying candidate segments of the telecommunications network, second data identifying candidate sites of the telecommunications network, and third data identifying candidate hubs of the telecommunications network, generate a network graph representation of the telecommunications network based on the incomplete geospatial coordinate data, the network graph representation includes edges corresponding to the candidate segments, a first set of nodes corresponding to the candidate sites and a second set of nodes corresponding to the candidate hubs, determine, for each candidate site, a candidate site score based on a quantity of candidate segments to connect the candidate site to a candidate hub, determine, for each candidate segment, a candidate segment score based on a quantity of candidate sites that connect to a candidate hub via the candidate segment, determine a prioritization of the candidate segments for traversal of the network graph representation based on the candidate site scores and the candidate segment scores, generate a recommendation for selecting or ordering the candidate segments based on the prioritization of the candidate segments, and provide the recommendation for display via a user interface.

According to some implementations, a non-transitory computer-readable medium may store one or more instructions. The one or more instructions, when executed by one or more processors of a device, may cause the one or more processors to: obtain network connection data associated with a point-to-point hub-and-spoke architecture network, the network connection data includes first data identifying candidate segments of the point-to-point hub-and-spoke architecture network and second data identifying candidate sites of the point-to-point hub-and-spoke architecture network, generate a network graph representation of the point-to-point hub-and-spoke architecture network based on the network connection data, the network graph representation includes edges corresponding to the candidate segments and nodes corresponding to the candidate sites, assign candidate site scores to the candidate sites based on a quantity of candidate segments associated with the candidate sites, assign, for each candidate segment, a segment score based on a quantity of candidate sites associated with the candidate segment, and determine a prioritization based on the candidate site scores and the segment scores, generate a recommendation for selecting or ordering the candidate segments based on the prioritization; and provide the recommendation for display via a user interface.

According to some implementations, a method may include obtaining incomplete geospatial coordinate data associated with a telecommunications network, the incomplete geospatial coordinate data includes first data identifying candidate segments of the telecommunications network and second data identifying candidate sites of the telecommunications network, generating a network graph representation of the telecommunications network based on the incomplete geospatial coordinate data, the network graph representation includes edges corresponding to the candidate segments and nodes corresponding to the candidate sites, determining a prioritization of the candidate segments for traversal of the network graph representation based on a parametrized objective function, generating a recommendation for selecting or ordering the candidate segments based on the prioritization of the candidate segments, and communicating with one or more other devices to perform one or more response actions to implement the recommendation.

BRIEF DESCRIPTION OF THE DRAWINGS

FIGS. 1A-1D are diagrams of an example implementation described herein.

FIGS. 4-6 are flow charts of example processes for network analysis and planning.

DETAILED DESCRIPTION

Figure 1B:
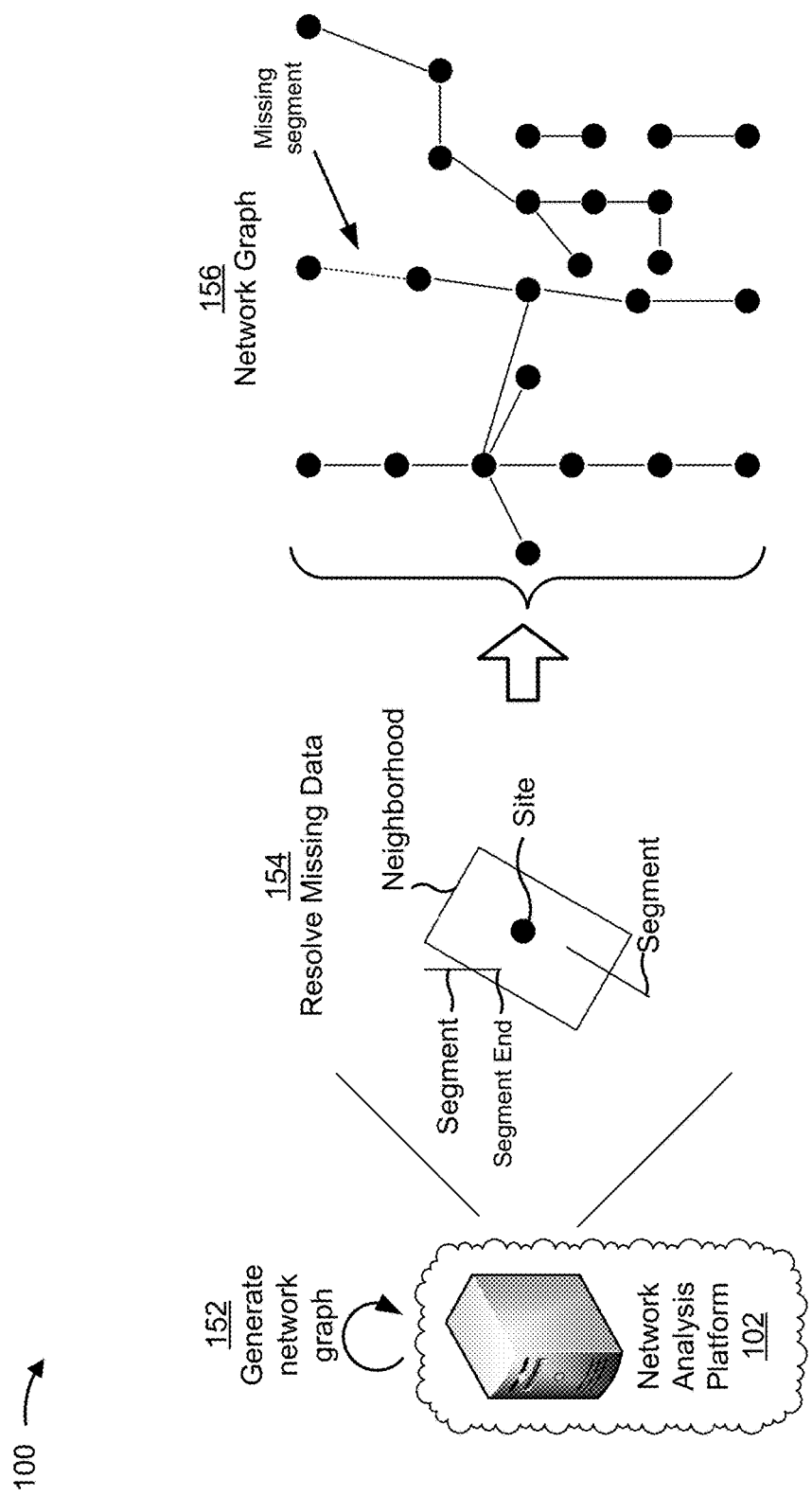

The following detailed description of example implementations refers to the accompanying drawings. The same reference numbers in different drawings may identify the same or similar elements.

A telecommunications network may be deployed as a point-to-point hub-and-spoke network with a set of sites or hubs interconnected by a set of segments. A hub may be a central entity of a network, such as a base station that is connected to a network backend. A site may be a distributed entity of the network, such as a base station that connects to the network backend via the hub. A segment may be a link between entities of the network, such as a link between a hub and a site, a link between a first site and a second site, and/or the like. Each segment may have segments that connect to a site or a hub. For example, a segment may include a first segment connected to a hub and a second segment connected to a site, thereby enabling the site to communicate with the hub. Segments in a network may be wireline segments, wireless segments, a combination of wireline segments and wireless segments, and/or the like.

Telecommunications network deployments may have increasing quantities of hubs, sites, and/or segments to provide telecommunications services to increasingly densely packed user devices. During planning of a telecommunications network, a base station may be deployed at a site and may be selected to provide telecommunications service to a user devices within a service area of the base station. The site may be selected based on a level of congestion in a service area that may be covered by a base station at the site. For example, when a level of congestion exceeds a threshold over a threshold period of time, network planners may determine to deploy additional base stations at additional sites in an area to reduce the level of congestion for any one base station in the area. In this way, network planning may be used to load balance a network and provide telecommunications services.

However, some telecommunications networks may be inefficiently deployed as a result of base stations being deployed on an ad hoc basis as demand increases. For example, loads in a particular area may change as a result of different types of user devices being deployed, different area usage patterns (e.g., housing in an area becoming more or less densely packed), and/or the like. Additionally, or alternatively, when a telecommunications network deployment is planned, data regarding the telecommunications network may be incomplete. For example, site construction reports may omit information regarding which segments are connected to which sites, as a result of human error, record-keeping forms that do not record all relevant information for telecommunications network planning, and/or the like.

Some implementations described herein enable network analysis and planning. For example, a network analysis platform may obtain network connection data, such as geospatial coordinate data, which may be incomplete, and may process the network connection data to generate a network graph model of the telecommunications network to enable network analysis and planning. Additionally, or alternatively, the network analysis platform may automatically analyze the network graph to prioritize candidate segments (e.g., existing segments or proposed segments) and/or candidate sites (e.g., existing sites or proposed sites) within the telecommunications network, and may provide recommendations relating to the telecommunications network based on prioritizing the segments and/or candidate sites. In this way, the network analysis platform may enable efficient deployment of resources for a telecommunications network, such as an efficient deployment of a limited quantity of base stations, an efficient ordering of when to deploy base stations to maximize network coverage, an efficient ordering of network segments to connect to ensure network connectivity, and/or the like. Additionally, or alternatively, the network analysis platform may provide information associated with visualizing a status of the telecommunications network, optimizing connectivity within the telecommunications network, and/or the like.

In this way, by enabling network graph analysis of a telecommunications network to optimize a deployment, the network analysis platform may enable deployment of a telecommunications network with fewer resources to achieve a particular network capacity. Additionally, or alternatively, the network analysis platform may enable deployment of a telecommunications network with a greater network capacity using the same resources as may be used for lesser network capacity with ad hoc planning. Additionally, or alternatively, the network analysis platform may reduce a likelihood of network congestion as a result of incomplete network connectivity (e.g., candidate sites being disconnected from other candidate sites), which may result from inefficient ad hoc network planning.

Although some implementations are described herein in terms of a geospatial coordinate data for a telecommunications network, implementations described herein may be used for network analysis of any type of network, such as any other type of point-to-point hub-and-spoke network.

FIGS. 1A-1D are diagrams of an example implementation 100 described herein. As shown in FIG. 1A, example implementation 100 includes a network analysis platform 102.

As shown in FIG. 1A, and by reference number 150, network analysis platform 102 may obtain network connection data. For example, network analysis platform 102 may receive geospatial coordinate data identifying coordinates for candidate segmentpoints, candidate sites, candidate hubs, and/or the like of a network. Additionally, or alternatively, network analysis platform 102 may receive geospatial coordinate data identifying a type of a candidate site, a type of a candidate hub, and/or the like. Additionally, or alternatively, network analysis platform 102 may receive geospatial coordinate data identifying a location of a candidate segment, a quantity of fibers (e.g., optical fibers for conveying information of a telecommunications network) in a candidate segment corresponding to the candidate segment, and/or the like. In this case, the network may be a fronthauling or small-cell backhauling layer of a 4G or 5G telecommunications network. Additionally, or alternatively, the network connection data may be coordinate data identifying locations of candidate segments and candidate sites for any other type of point-to-point hub-and-spoke branching network.

In some implementations, the network connection data may be a particular type of data. For example, network analysis platform 102 may obtain a construction report identifying locations at which a base station is to be constructed or has been constructed. Additionally, or alternatively, network analysis platform 102 may receive a data structure identifying a set of street addresses at which service calls have been performed on candidate segments, candidate segments, splices of candidate segments, and/or the like. Additionally, or alternatively, network analysis platform 102 may receive location data from a set of user devices, and network analysis platform 102 may predict a location of a current or new base station and a candidate site thereof based on the location data from the set of user devices.

In some implementations, the network connection data may be incomplete (e.g., incomplete geospatial coordinate data). For example, network analysis platform 102 may parse a construction report to identify geospatial coordinate data for a candidate segment, but the construction report may not identify splice connections associated with a candidate segment that includes the candidate segment. In this case, the splice connections may represent missing connections not identified by the network connection data, and network analysis platform 102 may resolve the missing connections when generating the network graph, as described in more detail herein.

In some implementations, network analysis platform 102 may use a process pipeline for obtaining the network connection data. For example, network analysis platform 102 may obtain partial data files including network connection data, insert the partial data files into a database as new items, and update existing data files in the database based on the new items. In this case, network analysis platform 102 may selectively re-calculate priorities and/or other parameters relating to a telecommunications network, as described herein, based on updating the existing data files. For example, network analysis platform 102 may identify a candidate segment and/or a candidate site (e.g., an edge and/or a node) affected by updating the existing data files, and may include the affected candidate segments and/or candidate sites in recalculations. By omitting non-affected candidate segments and/or candidate sites, network analysis platform 102 may reduce processing utilization relative to recalculating priorities and/or other parameters for an entire network whenever new data is obtained. After recalculating for the affected candidate segments and/or candidate sites, network analysis platform 102 may propagate the recalculated priorities and/or other parameters to non-affected portions of a network graph, thereby accounting for interconnectivity of the network graph without performing complete recalculations for the network graph. For example, when a change in the existing data files affects only a cost value, as described herein, network analysis platform 102 may propagate an updated cost value to candidate segments without recalculating connections between the candidate segments, thereby reducing processing relative to recalculating the connections even when the connections have not changed.

As shown in FIG. 1B, and by reference numbers 152, 154, and 156 network analysis platform 102 may generate a network graph from the network connection data and may resolve missing data in the network connection data. For example, network analysis platform 102 may generate a set of nodes representing candidate sites and hubs of a telecommunications network. Additionally, or alternatively, network analysis platform 102 may generate a set of edges representing candidate segments of the telecommunications network. In some implementations, network analysis platform 102 may generate the set of edges and the set of nodes to represent candidate segments and candidate sites or hubs, respectively. For example, during resolution of missing data, network analysis platform 102 may resolve missing connections that are not identified by the incomplete geospatial data. In this case, network analysis platform 102 may not distinguish between whether the missing connections correspond to real candidate segments, but may instead determine that a candidate segment can be located at a location of a missing connection to enable network planning and prioritization.

Although some implementations are described herein in terms of network graph representation, other representations are possible, such as non-graphical data representations, matrix representations, and/or the like.

In some implementations, network analysis platform 102 may resolve connectivity issues within a dataset of the network connection data. For example, network analysis platform 102 may determine, based on incomplete geospatial coordinate data, that a relationship between a candidate segment and one or more other candidate segments or candidate sites is not identified by the incomplete geospatial coordinate data. In this case, the data may be incomplete based on the relationship existing but not being identified (e.g., missing data), the relationship being under construction or planned (e.g., the candidate segment is to be connected to another candidate segment or candidate site, but data has not yet been generated to identify the connection since the connection is not complete), and/or the like.

In some implementations, network analysis platform 102 may identify a set of network constraints to resolve connectivity issues. For example, network analysis platform 102 may determine a proximity criterion and may define a neighborhood around a candidate segment or a disconnected candidate site based on the proximity criterion. In some implementations, network analysis platform 102 may define the neighborhood based on a connectivity model. For example, network analysis platform 102 may, before generating the network graph, generate a connectivity model to model connectivity in point-to-point hub-and-spoke networks. In this case, network analysis platform 102 may learn a size, a shape, an orientation, and/or the like for neighborhoods, and may define a neighborhood based on the connectivity model. For example, as shown by reference number 154, a neighborhood for a set of candidate segments and a candidate site may be a parametrized rectangular region defined at an end of a disconnected candidate segment. In this case, network analysis platform 102 may evaluate any candidate site that is located within the neighborhood as a potential connection point for the candidate segment. Based on evaluating the candidate sites, network analysis platform 102 may interconnect candidate segments (e.g., based on data identifying splices that connect candidate segments) and connect candidate sites to the interconnected candidate segments.

In some implementations, network analysis platform 102 may perform a connectivity resolution procedure to identify possible connectivity for the network graph representation of the telecommunications network. For example, network analysis platform 102 may, for each candidate segment, define a neighborhood around the candidate segment that is parametrized by candidate segment length of a candidate segment corresponding to the candidate segment; determine whether a candidate site or hub is within the neighborhood; and evaluate whether connecting the candidate site or hub to the candidate segment satisfies one or more network connection constraints (e.g., that each candidate site have only one incoming candidate segment, that a hub has only outgoing candidate segments, and/or the like). In this case, if the one or more network connection constraints are satisfied, network analysis platform 102 may generate the network graph such that the candidate site or hub is a potential connection for the candidate segment. In contrast, if the one or more network connection constraints are not satisfied, network analysis platform 102 may determine whether the candidate segment can be connected to a closest splice (e.g., an existing splice, a newly created splice, and/or the like) and satisfy another one or more network connection constraints (e.g., that the candidate segment is only connected to a single hub, candidate site, or splice, that the splice has only a single incoming candidate segment, and/or the like). In this case, if network analysis platform 102 determines that the other one or more network connection constraints are satisfied, network analysis platform 102 may add the splice as a potential connection for the candidate segment. In contrast, if the other one or more network connection constraints are not satisfied, network analysis platform 102 may determine to create a new splice location at the candidate segment. Additionally, or alternatively, network analysis platform 102 may connect a disconnected hub or candidate site to a closest splice within a neighborhood of the disconnected hub or candidate site. In this way, network analysis platform 102 may generate a logical network graph from incomplete geospatial coordinate data.

In some implementations, network analysis platform 102 may generate one or more candidate segments and/or candidate segments for the network graph to resolve a connectivity issue. For example, network analysis platform 102 may identify one or more candidate sites that lack a candidate segment to connect the one or more candidate sites to one or more other candidate sites. In this case, network analysis platform 102 may generate a directed graph with edges representing candidate segments and nodes representing candidate sites, hubs, splices, and/or the like. The directed graph may have a directionality from hubs to candidate sites and from hubs to splices. In some implementations, network analysis platform 102 may search the directed graph using a network graph analysis technique. For example, network analysis platform 102 may identify orphan roots of trees (e.g., nodes that are roots in the network graph but are candidate sites or splices rather than hubs). In this case, network analysis platform 102 may identify the roots as being orphan roots based on the roots having an indegree of zero (e.g., a quantity of edges directed to a node is zero). In some implementations, network analysis platform 102 may select a closest connected node (e.g., another candidate site, splice, or hub) to an orphan root and may generate a candidate segment and candidate segment, such that the candidate segment and the candidate segment satisfy a connection constraint (e.g., that the candidate segment does not cross another candidate segment, that the candidate segment connects the orphan root via a shortest path, and/or the like). If the candidate segment cannot satisfy the connection constraint, network analysis platform 102 may identify a next closest node and may attempt to generate a candidate segment. In this way, network analysis platform 102 generates a logical network graph based on incomplete geospatial coordinate data, such that topological requirements of a network are satisfied.

In some implementations, network analysis platform 102 may use artificial intelligence to resolve connectivity issues based on incomplete geospatial coordinate data. For example, network analysis platform 102 may generate a model of network topology (e.g., a machine learning model of a network topology of telecommunications networks) using parameters relating to neighborhood size, neighborhood shape, network connectivity rules, candidate segment placement rules, costs, values, building capacity, and/or the like, and may use the model of network topology to predict a network topology that may exist based on incomplete data identifying the network topology.

Additionally, or alternatively, network analysis platform 102 may use the model of network topology to recommend changes to the network topology, such as using graph optimization algorithms to identify disconnected candidate sites and/or candidate segments that can be connected, shortest paths from candidate sites to hubs that can be added, and/or the like. In some implementations, network analysis platform 102 may use historical data to train the artificial intelligence model to estimate optimized parameters. In this way, a large quantity of data points regarding other telecommunications networks or a history of construction of telecommunications networks can be used to optimize planning and scheduling of a new or under construction telecommunications network. For example, network analysis platform 102 may use data regarding existing point-to-point hub-and-spoke networks, construction data regarding previous telecommunications network construction plans, and/or the like as training data and may train the model of network topology and validate an accuracy of the model of network topology. In this way, thousands, millions, or even billions of data points regarding other telecommunications networks can be used to optimize a particular telecommunications network.

As shown in FIG. 1B, and by reference numbers 158 and 160, network analysis platform 102 may analyze the network graph to determine a prioritization for a set of candidate segments (e.g., actual candidate segments, planned candidate segments, recommended or proposed candidate segments, and/or the like) and candidate sites or hubs (e.g., actual candidate sites or hubs, planned candidate sites or hubs, recommended or proposed candidate sites or hubs, and/or the like).

In some implementations, network analysis platform 102 may use a page ranking type algorithm to determine a prioritization for the network graph. For example, network analysis platform 102 may generate, based on the network graph, a branching reversed diagraph (e.g., another network graph with directionality of edges reversed relative to the network graph) with a directionality from candidate sites to hubs, may determine a node rank for each node based on a quantity of links associated with a node, may map ranks of the nodes to incoming edges to determine a priority for each edge, may normalize and discretize the priority for each edge, and may provide the priority for each edge as a priority for a corresponding candidate segment. In some implementations, network analysis platform 102 may rank edges based on an objective function. For example, network analysis platform 102 may determine a rank of a link based on a value to a network of the link (e.g., which may correspond to a rank of the edge) relative to a cost of the link.

In some implementations, the rank may relate to an importance of an edge (e.g., a candidate segment and a candidate segment) to a network and a network topology thereof. For example, network analysis platform 102 may determine the importance of the edge in terms of network connectivity facilitated by the edge, based on a quantity of other edges connecting to the edge, a value of a candidate segment represented by the edge, a cost of the candidate segment represented by the edge, and/or the like. In this case, based on determining the rank of an edge, network analysis platform 102 may determine a rank of a link of one or more edges, splices, and/or the like, and may use the rank of the edge and the rank of the link that includes the edge to determine a priority of a candidate segment.

In some implementations, network analysis platform 102 may determine a node cost (e.g., a sum of a cost of each link to connect a candidate site to a hub) (shown in FIG. 1C as "Site Cost"), a link value vector (e.g., a value of each candidate site that is connected to a candidate segment) (shown as "V"), a link cost vector (e.g., a cost of each candidate site that is connected to a candidate segment) (shown as "C"), and/or the like. Based on the candidate site costs, link value vectors, and link cost vectors, as described in more detail herein, network analysis platform 102 may determine a cumulative candidate segment cost (shown as "CC") and/or a cumulative candidate segment value (shown as "CV"). In some implementations, network analysis platform 102 may determine the link value vector based on a candidate site type, candidate site location, quantity of fibers at the candidate site, and/or the like. Additionally, or alternatively, a link cost vector may be based on a candidate segment length. In some implementations, the node cost may be adjusted based on a node type criterion. For example, network analysis platform 102 may determine the node cost, as described herein, and may alter the node cost based on whether the node represents a candidate site, a splice, a hub, and/or the like.

In some implementations, network analysis platform 102 may traverse the network graph to determine the node cost, the link value vector, the link cost vector, and/or the like. In some implementations, to traverse the network graph, network analysis platform 102 may generate a depth-first search (DFS) representation of nodes of the network graph.

In some implementations, network analysis platform 102 may perform a forward pass using the depth-first search representation of nodes of the network graph. For example, network analysis platform 102 may start at each root of the network graph (e.g., each hub) and traverse each edge to each leaf of the network graph (e.g., candidate sites at a boundary of the telecommunications network). In this case, network analysis platform 102 may use the forward pass to calculate node costs and propagate the node costs from hubs to candidate sites (e.g., a node cost is a cost of the parent node of the node plus a cost associated with an edge connected the node to the parent node). For example, network analysis platform 102 may determine the node cost $n_i$ as:

$$n_i = n_{i-1} + l_{(i-1,i)}$$

where $l_{(i-1,i)}$ in the cost of building a link that ends at node i and a cost of a first node (e.g., a hub) is zero (e.g., $n_1=0$).

Figure 1C:
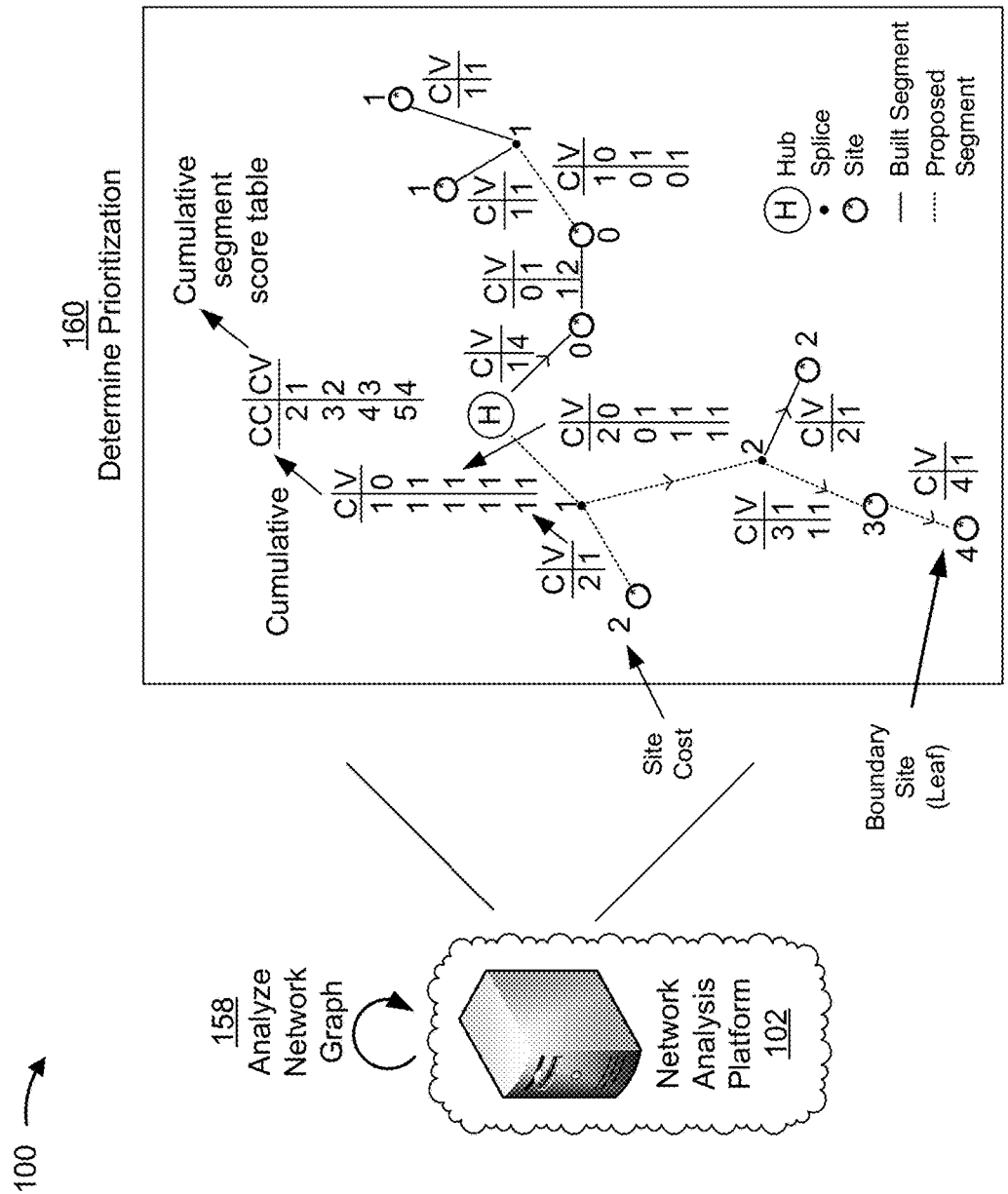

Additionally, or alternatively, network analysis platform 102 may perform a backward pass traversal of the network graph and may traverse from leaves to roots to determine the cost vectors and value vectors for the network graph. In this case, for each node $n_i$, network analysis platform 102 may select a particular link $l_{i-1,i}$ where $l_{i-1,i}$, represents a link from node $n_i$ to node $n_{i-1}$. Further, network analysis platform 102 may determine a value vector $v_j$ for a particular link by concatenating value vectors of each link from a leaf of a tree to the particular link, and may determine a cost vector $c_j$ by concatenating cost vectors of each link from leaves of the tree, as shown in FIG. 1C. In some implementations, network analysis platform 102 may remove cost vectors for downstream links before concatenation, to avoid double-counting cost vectors when determining a cost vector for a particular node.

In some implementations, based on performing the forward pass traversal and the backward pass traversal, network analysis platform 102 may evaluate a rank function using the node costs, link value vector, link cost vector, and/or the like to calculate ranks for the edges and nodes. For example, network analysis platform 102 may determine an objective function as:

$$p_i = \lambda \sum_{v_i \in V_i, c_i \in C_i} v_i^2 / c_i^{1/2} + (1 - \lambda) \sum_{v_i \in V_i, c_i \in C_i} v_i^{1/2} / c_i^2$$

where $p_i$ represents a priority, from which links (e.g., the candidate segments) may be ranked) and $\lambda$ is a time-scale parameter to account for long-term or short-term priorities.

Additionally, or alternatively, network analysis platform 102 may discretize the ranks to determine normalized, discrete priority values. For example, network analysis platform 102 may evaluate an objective function based at least in part on the value vector and cost vector for a link to determine the rank of a link that includes one or more candidate segments. In some implementations, network analysis platform 102 may use machine learning to learn parameters of functions evaluated to determine the priorities (e.g., parameters of the objective function). For example, network analysis platform 102 may perform supervised machine learning to optimize parameters for variations in data availability, network structure, cost versus value strategy, population patterns, and/or the like. In this way, by using supervised machine learning, network analysis platform 102 may optimize parameters with reduced processing relative to unsupervised machine learning.

Figure 1D:
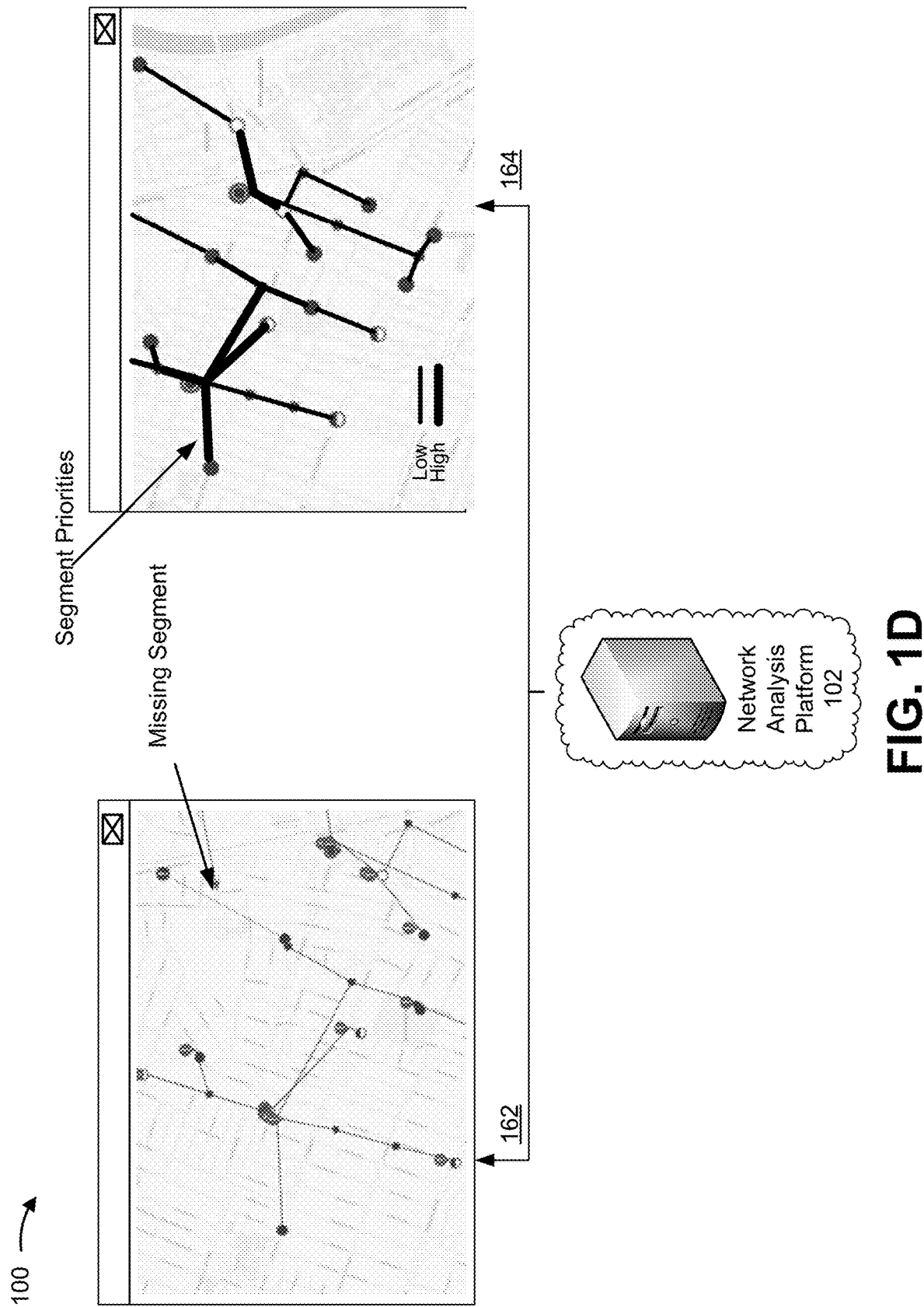

As shown in FIG. 1D, and by reference numbers 162 and 164, network analysis platform 102 may provide a set of user interface views (e.g., for display via a client device) based on analyzing the network graph. For example, network analysis platform 102 may provide a first user interface view identifying a missing candidate segment (e.g., that is predicted based on incomplete geospatial coordinate data, that is recommended to be connected to an unconnected candidate site, and/or the like), as shown by reference number 162. Additionally, or alternatively, network analysis platform 102 may provide information identifying a set of priorities (e.g., which may be indicated by thicknesses of each candidate segment) for a set of candidate segments, as shown by reference number 164.

In some implementations, network analysis platform 102 may provide information identifying a recommendation for display via a user interface. For example, network analysis platform 102 may provide information identifying a set of recommended candidate sites to optimize connectivity in the network based on analyzing the network graph for costs and benefits associated with candidate sites and candidate segments. Additionally, or alternatively, network analysis platform 102 may provide information identifying a set of recommended candidate segments to optimize connectivity. In some implementations, network analysis platform 102 may communicate with one or more other devices to automatically implement a recommendation. For example, network analysis platform 102 may automatically schedule a candidate site for construction (e.g., in an order based on a priority of the candidate sites and/or candidate segments), determine and provide a construction schedule for display via client devices used by construction managers, order a set of construction materials for delivery to a construction candidate site, bid on a purchase of a candidate site, transmit a notification to an owner of a candidate site to request a meeting regarding purchasing the candidate site, and/or the like. In some implementations, network analysis platform 102 may automatically adjust one or more network parameters. For example, based on analyzing the network graph, network analysis platform 102 may automatically adjust a load balancing parameter or another type of network resource parameter to account for the network connectivity.

As indicated above, FIGS. 1A-1D are provided merely as one or more examples. Other examples may differ from what is described with regard to FIGS. 1A-1D.

Figure 2:
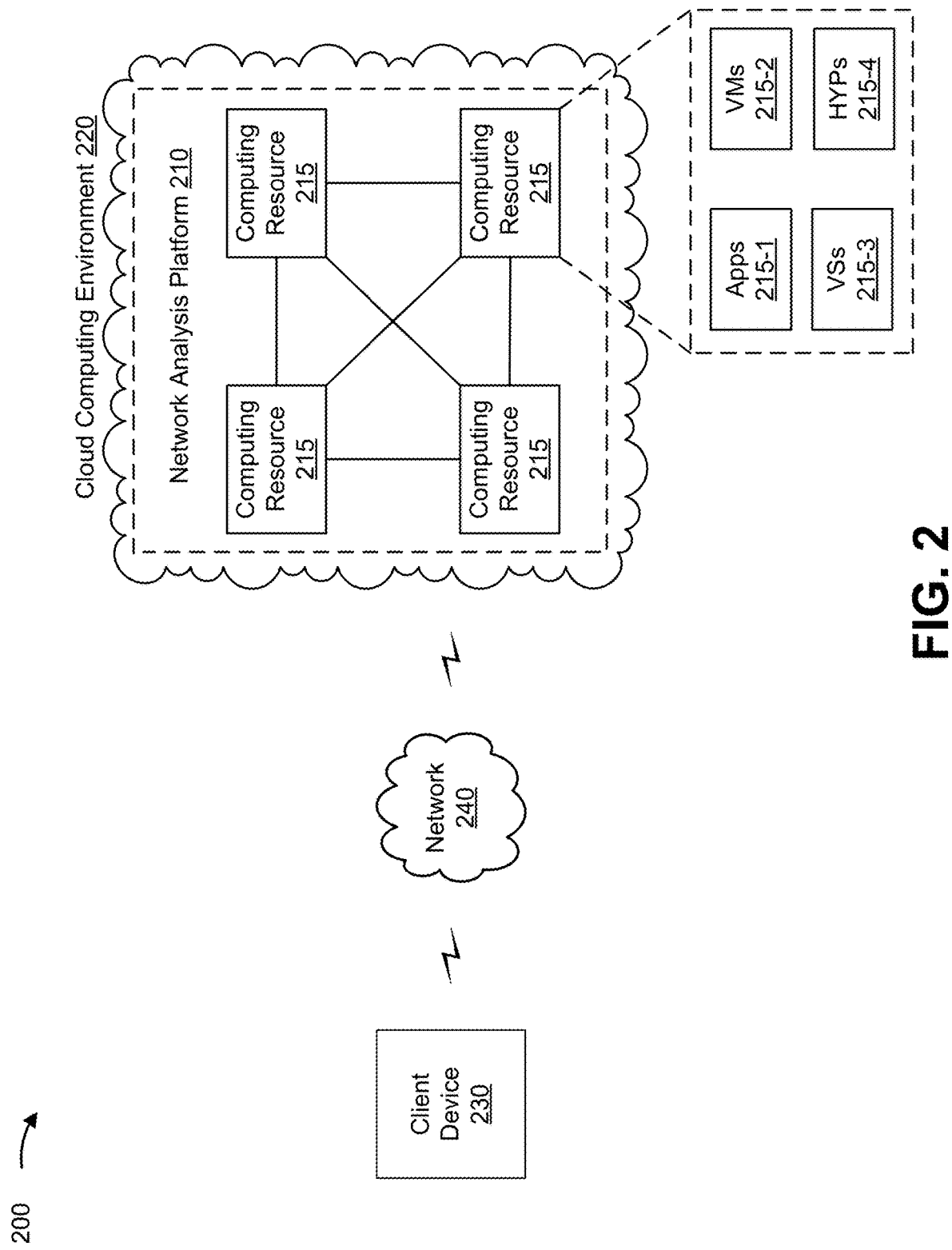
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network analysis platform 210, a computing resource 215, a cloud computing environment 220, a client device 230, and a network 240. Devices of environment 200 may interconnect via wired connections, wireless connections, or a combination of wired and wireless connections.

Network analysis platform 210 includes one or more computing resources assigned to analyze a point-to-point hub-and-spoke network. For example, network analysis platform 210 may be a platform implemented by cloud computing environment 220 that may analyze a telecommunications network. In some implementations, network analysis platform 210 is implemented by computing resources 215 of cloud computing environment 220.

Network analysis platform 210 may include a server device or a group of server devices. In some implementations, network analysis platform 210 may be hosted in cloud computing environment 220. Notably, while implementations described herein may describe network analysis platform 210 as being hosted in cloud computing environment 220, in some implementations, network analysis platform 210 may be non-cloud based or may be partially cloud based.

Cloud computing environment 220 includes an environment that provides on-demand availability of computer system resources as a service, whereby shared resources, services, and/or the like may be provided to analyze a point-to-point hub-and-spoke network. Cloud computing environment 220 may provide computation, software, data access, storage, and/or other services that do not require end-user knowledge of a physical location and configuration of a system and/or a device that delivers the services. As shown, cloud computing environment 220 may include network analysis platform 210 and a computing resource 215.

Computing resource 215 includes one or more personal computers, workstation computers, server devices, or another type of computation and/or communication device. In some implementations, computing resource 215 may host network analysis platform 210. The cloud resources may include compute instances executing in computing resource 215, storage devices provided in computing resource 215, data transfer devices provided by computing resource 215, and/or the like. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by client device 230. Application 215-1 may eliminate a need to install and execute the software applications on client device 230. For example, application 215-1 may include software associated with network analysis platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program and may support a single process. In some implementations, virtual machine 215-2 may execute on behalf of a user (e.g., client device 230), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems and may manage the execution of the guest operating systems. Multiple instances of a variety of operating systems may share virtualized hardware resources.

Client device 230 includes one or more devices capable of receiving, generating, storing, processing, and/or providing information associated with analyzing a point-to-point hub-and-spoke network. For example, client device 230 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device. In some implementations, client device 230 may be a network device of a network that may be controlled by network analysis platform 210.

Network 240 includes one or more wired and/or wireless networks. For example, network 240 may include a telecommunications network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
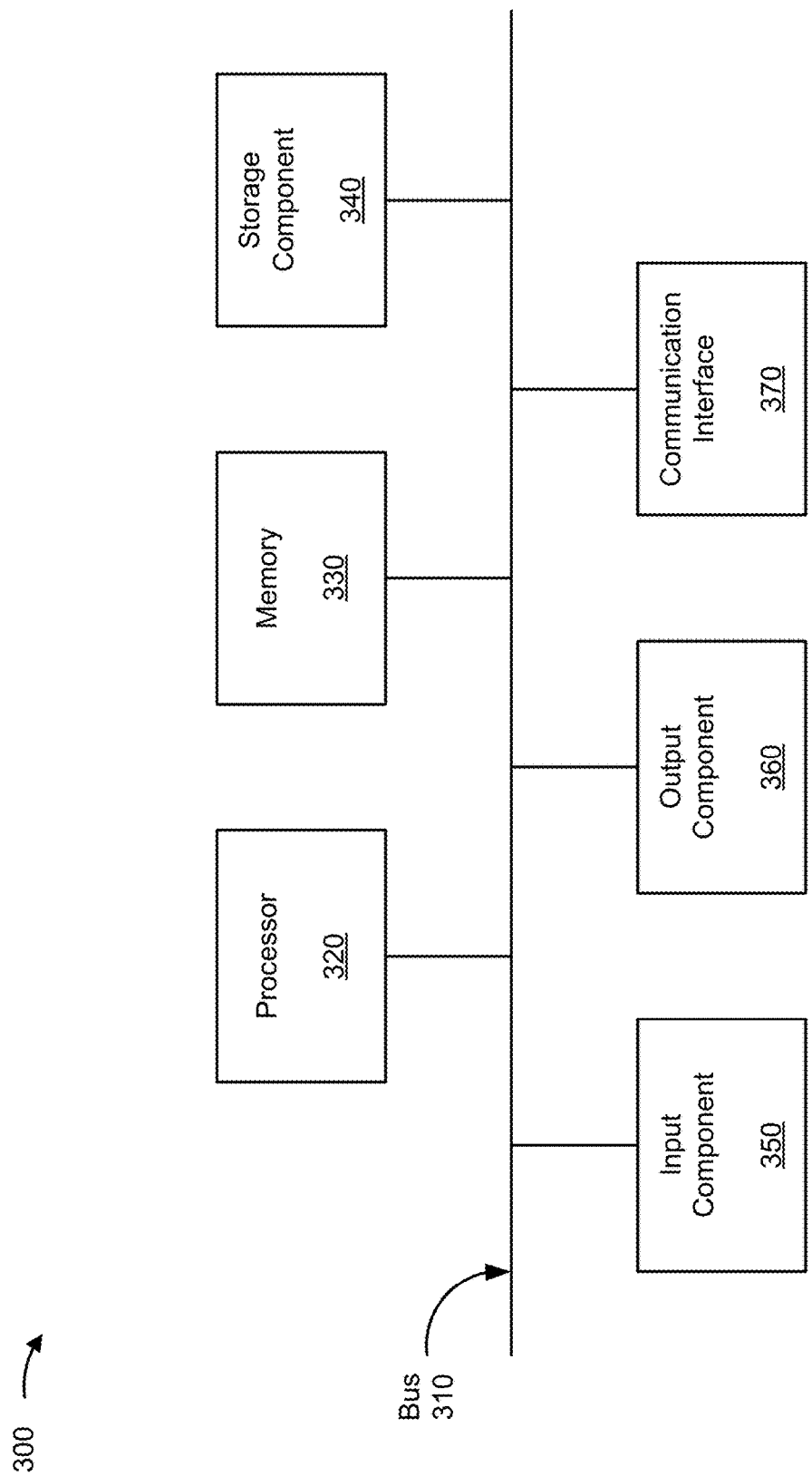
FIG. 3 is a diagram of example components of one or more devices of FIG. 2.

FIG. 3 is a diagram of example components of a device 300. Device 300 may correspond to network analysis platform 210, computing resource 215, and/or client device 230. In some implementations, network analysis platform 210, computing resource 215, and/or client device 230 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a telecommunications network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
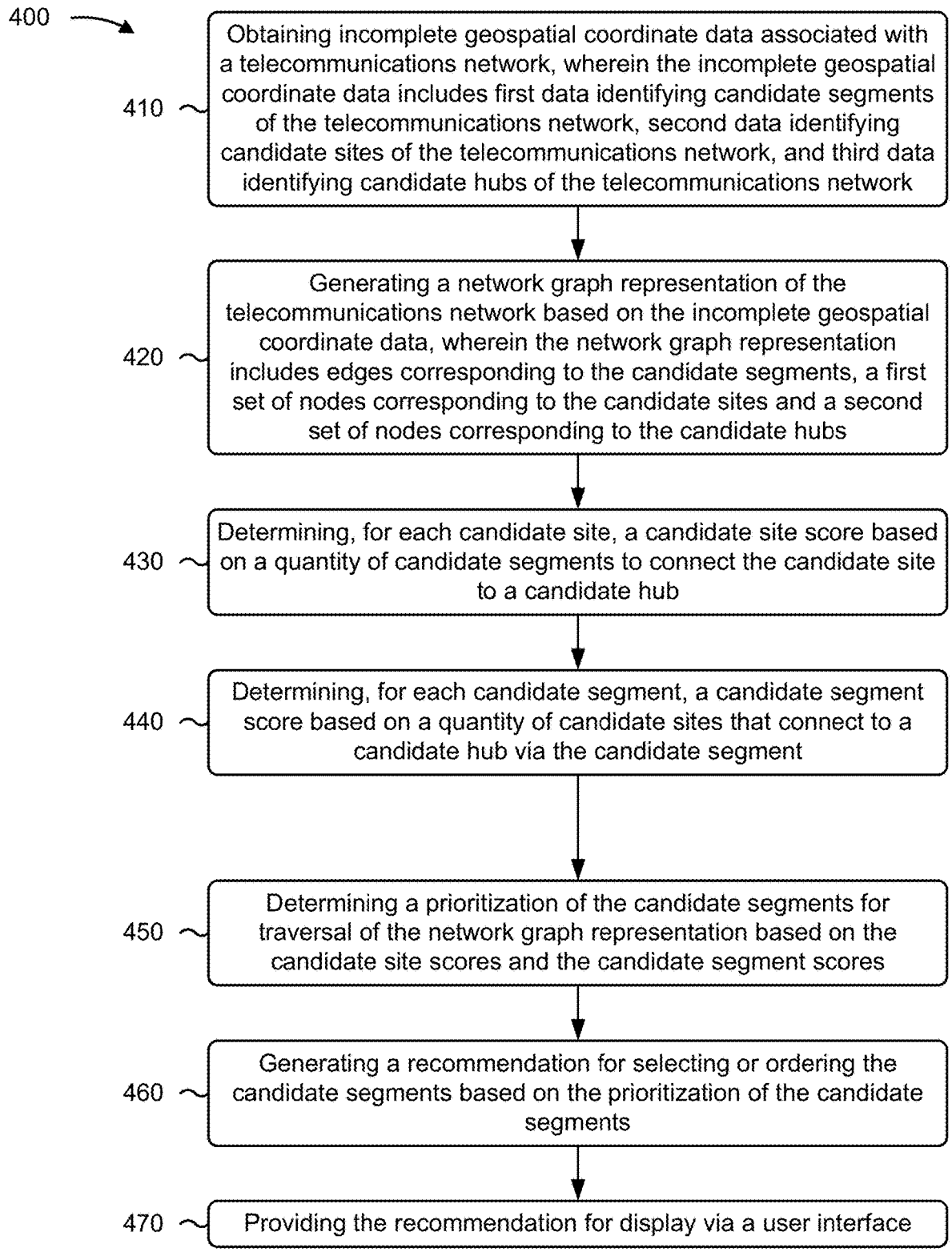

FIG. 4 is a flow chart of an example process 400 for network analysis and planning. In some implementations, one or more process blocks of FIG. 4 may be performed by a network analysis platform (e.g., network analysis platform 210). In some implementations, one or more process blocks of FIG. 4 may be performed by another device or a group of devices separate from or including the network analysis platform, such as a computing resource (e.g., computing resource 215), a client device (e.g., client device 230), and/or the like.

As shown in FIG. 4, process 400 may include obtaining incomplete geospatial coordinate data associated with a telecommunications network, wherein the incomplete geospatial coordinate data includes first data identifying candidate segments of the telecommunications network, second data identifying candidate sites of the telecommunications network, and third data identifying candidate hubs of the telecommunications network (block 410). For example, the network analysis platform (e.g., using processor 320, memory 330, storage component 340, input component 350, output component 360, communication interface 370 and/or the like) may obtain incomplete geospatial coordinate data associated with a telecommunications network, as described above. In some implementations, the incomplete geospatial coordinate data includes first data identifying candidate segments of the telecommunications network, second data identifying candidate sites of the telecommunications network, and third data identifying candidate hubs of the telecommunications network.

As further shown in FIG. 4, process 400 may include generating a network graph representation of the telecommunications network based on the incomplete geospatial coordinate data, wherein the network graph representation includes edges corresponding to the candidate segments, a first set of nodes corresponding to the candidate sites and a second set of nodes corresponding to the candidate hubs (block 420). For example, the network analysis platform (e.g., using processor 320, memory 330, storage component 340, input component 350, output component 360, communication interface 370 and/or the like) may generate a network graph representation of the telecommunications network based on the incomplete geospatial coordinate data, as described above. In some implementations, the network graph representation includes edges corresponding to the candidate segments, a first set of nodes corresponding to the candidate sites and a second set of nodes corresponding to the candidate hubs.

As further shown in FIG. 4, process 400 may include determining, for each candidate site, a candidate site score based on a quantity of candidate segments to connect the candidate site to a candidate hub (block 430). For example, the network analysis platform (e.g., using processor 320, memory 330, storage component 340, input component 350, output component 360, communication interface 370 and/or the like) may determine, for each candidate site, a candidate site score based on a quantity of candidate segments to connect the candidate site to a candidate hub, as described above.

As further shown in FIG. 4, process 400 may include determining, for each candidate segment, a candidate segment score based on a quantity of candidate sites that connect to a candidate hub via the candidate segment (block 440). For example, the network analysis platform (e.g., using processor 320, memory 330, storage component 340, input component 350, output component 360, communication interface 370 and/or the like) may determine, for each candidate segment, a candidate segment score based on a quantity of candidate sites that connect to a candidate hub via the candidate segment, as described above.

As further shown in FIG. 4, process 400 may include determining a prioritization of the candidate segments for traversal of the network graph representation based on the candidate site scores and the candidate segment scores (block 450). For example, the network analysis platform (e.g., using processor 320, memory 330, storage component 340, input component 350, output component 360, communication interface 370 and/or the like) may determine a prioritization of the candidate segments for traversal of the network graph representation based on the candidate site scores and the candidate segment scores, as described above.

As further shown in FIG. 4, process 400 may include generating a recommendation for selecting or ordering the candidate segments based on the prioritization of the candidate segments (block 460). For example, the network analysis platform (e.g., using processor 320, memory 330, storage component 340, input component 350, output component 360, communication interface 370 and/or the like) may generate a recommendation for selecting or ordering the candidate segments based on the prioritization of the candidate segments, as described above.

As further shown in FIG. 4, process 400 may include providing the recommendation for display via a user interface (block 470). For example, the network analysis platform (e.g., using processor 320, memory 330, storage component 340, input component 350, output component 360, communication interface 370 and/or the like) may provide the recommendation for display via a user interface, as described above.

Process 400 may include additional implementations, such as any single implementation or any combination of implementations described below and/or in connection with one or more other processes described elsewhere herein.

In a first implementation, process 400 includes interconnecting the candidate segments; and connecting the candidate sites to the candidate segments based on interconnecting the candidate segments, such that in the resulting network graph representation each candidate site is connected via a route to a corresponding candidate hub.

In a second implementation, alone or in combination with the first implementation, process 400 includes defining a neighborhood around a candidate segment end, corresponding to a candidate segment of the candidate segments, that is parametrized based on a segment length of the candidate segment; and selectively connecting a candidate site, of the candidate sites, to the candidate segment based on a location of the candidate site with respect to the neighborhood and based on a set of candidate site constraints.

In a third implementation, alone or in combination with one or more of the first and second implementations, process 400 includes defining a neighborhood around a candidate segment end, corresponding to a candidate segment of the candidate segments, that is parametrized based on a segment length of the candidate segment; and selectively connecting a candidate splice to the candidate segment based on a location of the candidate splice with respect to the neighborhood and based on a set of candidate site constraints, wherein the candidate splice is an existing candidate splice or a newly created candidate splice.

In a fourth implementation, alone or in combination with one or more of the first through third implementations, process 400 includes identifying one or more disconnected nodes of the nodes; defining one or more neighborhoods around the one or more disconnected nodes; and connecting the one or more disconnected nodes to one or more closest splices within the one or more neighborhoods based on proximity in the neighborhood and a set of constraints relating to network topology and connectivity logic.

In a fifth implementation, alone or in combination with one or more of the first through fourth implementations, process 400 includes generating a directed graph based on the incomplete geospatial coordinate data; searching the directed graph to identify one or more orphan roots that do not correspond to the candidate sites; and connecting the one or more orphaned roots to one or more closest nodes, of the directed graph, that correspond to a candidate site of the candidate sites in accordance with a set of constraints.

In a sixth implementation, alone or in combination with one or more of the first through fifth implementations, process 400 includes proposing, using a machine learning model of telecommunications networks, one or more new candidate segments, candidate sites, or candidate hubs not identified in the incomplete geospatial coordinate data; and adding the one or more new candidate segments, candidate sites, or candidate hubs to the network graph representation of the telecommunications network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for network analysis and planning. In some implementations, one or more process blocks of FIG. 5 may be performed by a network analysis platform (e.g., network analysis platform 210). In some implementations, one or more process blocks of FIG. 5 may be performed by another device or a group of devices separate from or including the network analysis platform, such as a computing resource (e.g., computing resource 215), a client device (e.g., client device 230), and/or the like.

As shown in FIG. 5, process 500 may include obtaining network connection data associated with a point-to-point hub-and-spoke architecture network, wherein the network connection data includes first data identifying candidate segments of the point-to-point hub-and-spoke architecture network and second data identifying candidate sites of the point-to-point hub-and-spoke architecture network (block 510). For example, the network analysis platform (e.g., using processor 320, memory 330, storage component 340, input component 350, output component 360, communication interface 370 and/or the like) may obtain network connection data associated with a point-to-point hub-and-spoke architecture network, as described above. In some implementations, the network connection data includes first data identifying candidate segments of the point-to-point hub-and-spoke architecture network and second data identifying candidate sites of the point-to-point hub-and-spoke architecture network.

As further shown in FIG. 5, process 500 may include generating a network graph representation of the point-to-point hub-and-spoke architecture network based on the network connection data, wherein the network graph representation includes edges corresponding to the candidate segments and nodes corresponding to the candidate sites (block 520). For example, the network analysis platform (e.g., using processor 320, memory 330, storage component 340, input component 350, output component 360, communication interface 370 and/or the like) may generate a network graph representation of the point-to-point hub-and-spoke architecture network based on the network connection data, as described above. In some implementations, the network graph representation includes edges corresponding to the candidate segments and nodes corresponding to the candidate sites.

As further shown in FIG. 5, process 500 may include assigning candidate site scores to the candidate sites based on a quantity of candidate segments associated with the candidate sites (block 530). For example, the network analysis platform (e.g., using processor 320, memory 330, storage component 340, input component 350, output component 360, communication interface 370 and/or the like) may assign candidate site scores to the candidate sites based on a quantity of candidate segments associated with the candidate sites, as described above.

As further shown in FIG. 5, process 500 may include assigning, for each candidate segment, a segment score based on a quantity of candidate sites associated with the candidate segment (block 540). For example, the network analysis platform (e.g., using processor 320, memory 330, storage component 340, input component 350, output component 360, communication interface 370 and/or the like) may assign, for each candidate segment, a segment score based on a quantity of candidate sites associated with the candidate segment; and, as described above.

As further shown in FIG. 5, process 500 may include determining a prioritization based on the candidate site scores and the segment scores (block 550). For example, the network analysis platform (e.g., using processor 320, memory 330, storage component 340, input component 350, output component 360, communication interface 370 and/or the like) may determine a prioritization based on the candidate site scores and the segment scores, as described above.

As further shown in FIG. 5, process 500 may include generating a recommendation for selecting or ordering the candidate segments based on the prioritization (block 560). For example, the network analysis platform (e.g., using processor 320, memory 330, storage component 340, input component 350, output component 360, communication interface 370 and/or the like) may generate a recommendation for selecting or ordering the candidate segments based on the prioritization, as described above.

As further shown in FIG. 5, process 500 may include providing the recommendation for display via a user interface (block 570). For example, the network analysis platform (e.g., using processor 320, memory 330, storage component 340, input component 350, output component 360, communication interface 370 and/or the like) may provide the recommendation for display via a user interface, as described above.

Process 500 may include additional implementations, such as any single implementation or any combination of implementations described below and/or in connection with one or more other processes described elsewhere herein.

In a first implementation, process 500 includes ranking each edge corresponding to a candidate segment based on an importance of the edge to a network topology of the network graph representation of the point-to-point hub-and-spoke architecture network.

In a second implementation, alone or in combination with the first implementation, process 500 includes ranking an edge, of the edges, corresponding to a candidate segment of the candidate segments based on at least one of a quantity of other edges of the edges connected to the edge, a value of the candidate segment, or a cost of the candidate segment.

In a third implementation, alone or in combination with one or more of the first and second implementations, process 500 includes generating a branching reversed digraph based on the network graph representation of the point-to-point hub-and-spoke architecture network; applying a page ranking type algorithm to determine node ranks based on the branching reversed digraph; adjusting the node ranks based on a node type criterion relating to whether a node corresponds to a splice or a candidate site; mapping the adjusted node ranking to incoming segment edges as segment priorities for the candidate segments; and normalizing and discretizing the segment priorities.

In a fourth implementation, alone or in combination with one or more of the first through third implementations, process 500 includes creating, for a tree of the network graph representation, a depth-first search list of network entities; calculating entity costs of the network entities using a forward pass of the depth-first search list; traversing, using a reversed of the depth-first search list, network edges, wherein traversing the network edges includes determining value vectors for the network edges; and determining cost vectors for the network edges; and determining the prioritization based on the value vectors, the cost vectors, and the entity costs.

In a fifth implementation, alone or in combination with one or more of the first through fourth implementations, process 500 includes determining an optimized order of construction for the candidate segments and the candidate sites based on the prioritization.

In a sixth implementation, alone or in combination with one or more of the first through fifth implementations, process 500 includes automatically implementing the recommendation.

In a seventh implementation, alone or in combination with one or more of the first through sixth implementations, process 500 includes generating a construction schedule for the point-to-point hub-and-spoke architecture network based on the recommendation; and communicating with a plurality of client devices to distribute the construction schedule.

In an eighth implementation, alone or in combination with one or more of the first through seventh implementations, process 500 includes automatically implementing the recommendation based on receiving feedback via the user interface.

In a ninth implementation, alone or in combination with one or more of the first through eighth implementations, process 500 includes determining a construction resource utilization for the point-to-point hub-and-spoke architecture network; and automatically distributing resources in proportion to a priority of candidate segments to be built based on the construction resource utilization and the prioritization.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
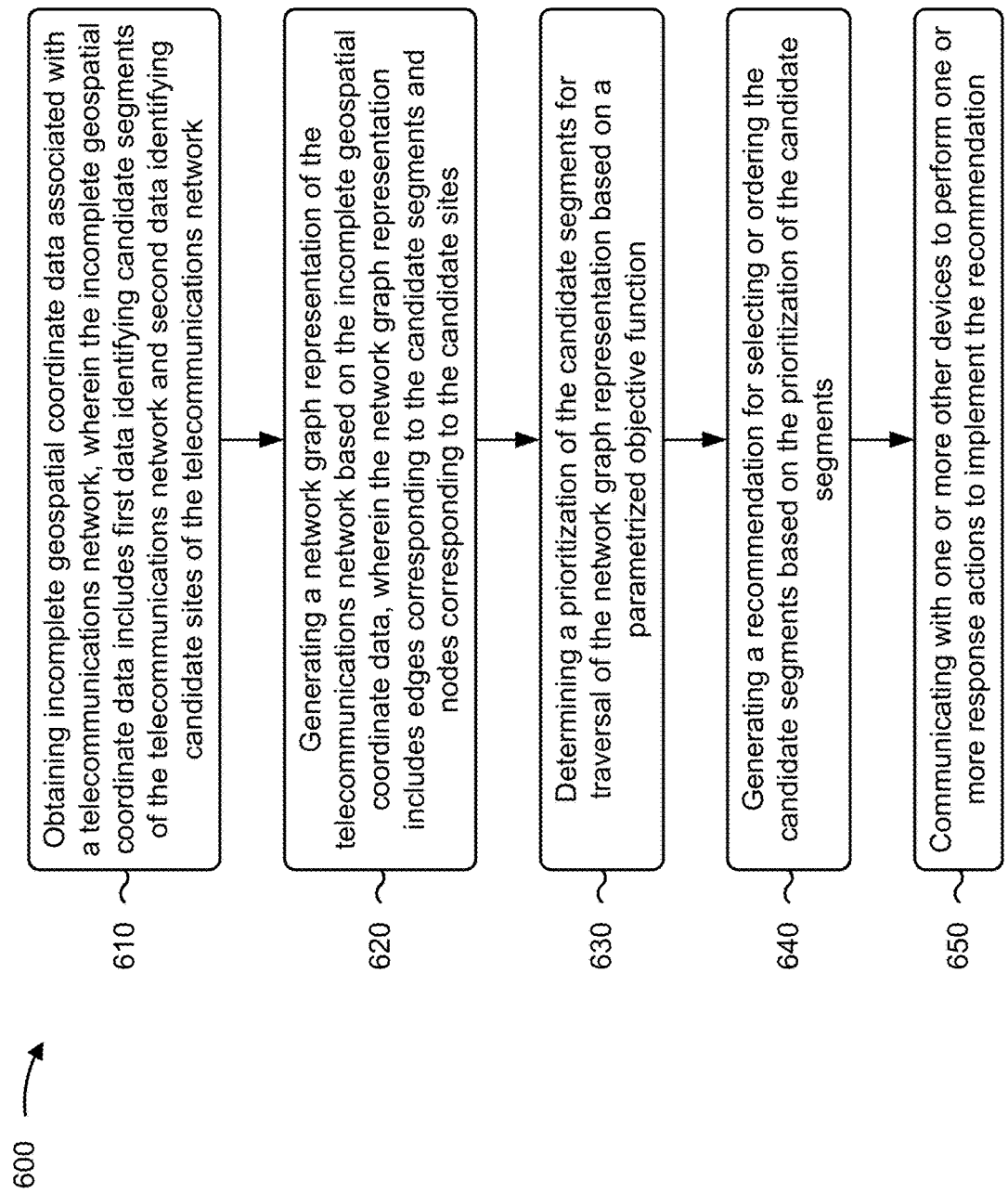

FIG. 6 is a flow chart of an example process 600 for network analysis and planning. In some implementations, one or more process blocks of FIG. 6 may be performed by a network analysis platform (e.g., network analysis platform 210). In some implementations, one or more process blocks of FIG. 6 may be performed by another device or a group of devices separate from or including the network analysis platform, such as a computing resource (e.g., computing resource 215), a client device (e.g., client device 230), and/or the like.

As shown in FIG. 6, process 600 may include obtaining incomplete geospatial coordinate data associated with a telecommunications network, wherein the incomplete geospatial coordinate data includes first data identifying candidate segments of the telecommunications network and second data identifying candidate sites of the telecommunications network (block 610). For example, the network analysis platform (e.g., using processor 320, memory 330, storage component 340, input component 350, output component 360, communication interface 370 and/or the like) may obtain incomplete geospatial coordinate data associated with a telecommunications network, as described above. In some implementations, the incomplete geospatial coordinate data includes first data identifying candidate segments of the telecommunications network and second data identifying candidate sites of the telecommunications network.

As further shown in FIG. 6, process 600 may include generating a network graph representation of the telecommunications network based on the incomplete geospatial coordinate data, wherein the network graph representation includes edges corresponding to the candidate segments and nodes corresponding to the candidate sites (block 620). For example, the network analysis platform (e.g., using processor 320, memory 330, storage component 340, input component 350, output component 360, communication interface 370 and/or the like) may generate a network graph representation of the telecommunications network based on the incomplete geospatial coordinate data, as described above. In some implementations, the network graph representation includes edges corresponding to the candidate segments and nodes corresponding to the candidate sites.

As further shown in FIG. 6, process 600 may include determining a prioritization of the candidate segments for traversal of the network graph representation based on a parametrized objective function (block 630). For example, the network analysis platform (e.g., using processor 320, memory 330, storage component 340, input component 350, output component 360, communication interface 370 and/or the like) may determine a prioritization of the candidate segments for traversal of the network graph representation based on a parametrized objective function, as described above.

As further shown in FIG. 6, process 600 may include generating a recommendation for selecting or ordering the candidate segments based on the prioritization of the candidate segments (block 640). For example, the network analysis platform (e.g., using processor 320, memory 330, storage component 340, input component 350, output component 360, communication interface 370 and/or the like) may generate a recommendation for selecting or ordering the candidate segments based on the prioritization of the candidate segments; and, as described above.

As further shown in FIG. 6, process 600 may include communicating with one or more other devices to perform one or more response actions to implement the recommendation (block 650). For example, the network analysis platform (e.g., using processor 320, memory 330, storage component 340, input component 350, output component 360, communication interface 370 and/or the like) may communicate with one or more other devices to perform one or more response actions to implement the recommendation, as described above.

Process 600 may include additional implementations, such as any single implementation or any combination of implementations described below and/or in connection with one or more other processes described elsewhere herein.

In a first implementation, the telecommunications network is a point-to-point hub-and-spoke branching network.

In a second implementation, alone or in combination with the first implementation, the incomplete geospatial coordinate data includes at least one of: a location of a candidate site, a type of the candidate site, a location of a hub, a type of the hub, a location of a candidate segment, or a quantity of fibers in a candidate segment.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
a memory; and
one or more processors operatively coupled to the memory, the memory and the one or more processors configured to:
obtain incomplete geospatial coordinate data associated with a telecommunications network,
wherein the incomplete geospatial coordinate data includes first data identifying candidate segments of the telecommunications network, second data identifying candidate sites of the telecommunications network, and third data identifying candidate hubs of the telecommunications network;
generate a network graph representation of the telecommunications network based on the incomplete geospatial coordinate data,
wherein the network graph representation includes edges corresponding to the candidate segments, a first set of nodes corresponding to the candidate sites and a second set of nodes corresponding to the candidate hubs,
wherein the one or more processors, when generating the network graph representation of the telecommunications network, are configured to:
define a neighborhood around a candidate segment end, corresponding to a candidate segment of the candidate segments, that is parametrized based on a segment length of the candidate segment, and
selectively connect a candidate site, of the candidate sites, to the candidate segment based on a location of the candidate site with respect to the neighborhood and based on a set of candidate site constraints;
determine, for each candidate site, a candidate site score based on a quantity of candidate segments to connect the candidate site to a candidate hub;
determine, for each candidate segment, a candidate segment score based on a quantity of the candidate sites that connect to a candidate hub via the candidate segment;
determine a prioritization of the candidate segments for traversal of the network graph representation based on the candidate site scores and the candidate segment scores;
generate a recommendation for selecting or ordering the candidate segments based on the prioritization of the candidate segments; and
provide the recommendation for display via a user interface.

2. The device of claim 1, wherein the one or more processors, when generating the network graph representation of the telecommunications network, are configured to:
interconnect the candidate segments; and
connect the candidate sites to the candidate segments based on interconnecting the candidate segments, such that in a resulting network graph representation each candidate site is connected via a route to a corresponding candidate hub.

3. The device of claim 1, wherein the one or more processors when generating the network graph representation of the telecommunications network are configured to:
define a neighborhood around a candidate segment end, corresponding to a candidate segment of the candidate segments, that is parametrized based on a segment length of the candidate segment; and
selectively connect a candidate splice to the candidate segment based on a location of the candidate splice with respect to the neighborhood and based on a set of candidate site constraints,
wherein the candidate splice is an existing candidate splice or a newly created candidate splice.

4. The device of claim 1, wherein the one or more processors, when generating the network graph representation of the telecommunications network, are configured to:
identify one or more disconnected nodes of the first set of nodes;
define one or more neighborhoods around the one or more disconnected nodes; and
connect the one or more disconnected nodes to one or more closest splices within the one or more neighborhoods based on proximity in the neighborhood and a set of constraints relating to network topology and connectivity logic.

5. The device of claim 1, wherein the one or more processors, when generating the network graph representation of the telecommunications network, are configured to:
generate a directed graph based on the incomplete geospatial coordinate data;
search the directed graph to identify one or more orphan roots that do not correspond to the candidate sites; and
connect the one or more orphan roots to one or more closest nodes, of the directed graph, that correspond to a candidate site of the candidate sites in accordance with a set of constraints.

6. The device of claim 1, wherein the one or more processors when generating the network graph representation of the telecommunications network are configured to:

propose, using a machine learning model of telecommunications networks, one or more new candidate segments, candidate sites, or candidate hubs not identified in the incomplete geospatial coordinate data; and add the one or more new candidate segments, the candidate sites, or the candidate hubs to the network graph representation of the telecommunications network.

7. A non-transitory computer-readable medium storing one or more instructions, the one or more instructions comprising:

one or more instructions that, when executed by one or more processors of a device, cause the one or more processors to:

obtain network connection data associated with a point-to-point hub-and-spoke architecture network,
wherein the network connection data includes first data identifying candidate segments of the point-to-point hub-and-spoke architecture network and second data identifying candidate sites of the point-to-point hub-and-spoke architecture network;

generate a network graph representation of the point-to-point hub-and-spoke architecture network based on the network connection data,
wherein the network graph representation includes edges corresponding to the candidate segments and nodes corresponding to the candidate sites;

assign candidate site scores to the candidate sites based on a quantity of candidate segments associated with the candidate sites;

assign, for each candidate segment, a segment score based on a quantity of the candidate sites associated with the candidate segment; and determine a prioritization based on the candidate site scores and the segment scores,
wherein the one or more instructions, that cause the one or more processors to determine the prioritization, cause the one or more processors to:
generate a branching reversed digraph based on the network graph representation of the point-to-point hub-and-spoke architecture network,
apply a page ranking type algorithm to determine node ranks based on the branching reversed digraph,
adjust the node ranks based on a node type criterion relating to whether a node corresponds to a splice or a candidate site,
map the adjusted node ranks to incoming segment edges as segment priorities for the candidate segments, and
normalize and discretize the segment priorities;

generate a recommendation for selecting or ordering the candidate segments based on the prioritization; and provide the recommendation for display via a user interface.

8. The non-transitory computer-readable medium of claim 7, wherein the one or more instructions, that cause the one or more processors to determine the prioritization, cause the one or more processors to:

rank each edge corresponding to a candidate segment based on an importance of the edge to a network topology of the network graph representation of the point-to-point hub-and-spoke architecture network.

9. The non-transitory computer-readable medium of claim 7, wherein the one or more instructions, that cause the one or more processors to determine the prioritization, cause the one or more processors to:

rank an edge, of the edges, corresponding to a candidate segment of the candidate segments based on at least one of:
a quantity of other edges of the edges connecting to the edge,
a value of the candidate segment, or
a cost of the candidate segment.

10. The non-transitory computer-readable medium of claim 7, wherein the one or more instructions, that cause the one or more processors to determine the prioritization, cause the one or more processors to:

create, for a tree of the network graph representation, a depth-first search list of network entities;
calculate entity costs of the network entities using a forward pass of the depth-first search list;
traverse, using a reverse of the depth-first search list, network edges,
wherein traversing the network edges comprises:
determine value vectors for the network edges; and
determine cost vectors for the network edges; and
determine the prioritization based on the value vectors, the cost vectors, and the entity costs.

11. The non-transitory computer-readable medium of claim 7, wherein the one or more instructions, that cause the one or more processors to generate the recommendation, cause the one or more processors to:

determine an optimized order of construction for the candidate segments and the candidate sites based on the prioritization.

12. The non-transitory computer-readable medium of claim 7, wherein the one or more instructions, when executed by the one or more processors, further cause the one or more processors to:

automatically implement the recommendation.

13. The non-transitory computer-readable medium of claim 12, wherein the one or more instructions, that cause the one or more processors to automatically implement the recommendation, cause the one or more processors to:

generate a construction schedule for the point-to-point hub-and-spoke architecture network based on the recommendation; and
communicate with a plurality of client devices to distribute the construction schedule.

14. The non-transitory computer-readable medium of claim 12, wherein the one or more instructions, that cause the one or more processors to automatically implement the recommendation, cause the one or more processors to:

automatically implement the recommendation based on receiving feedback via the user interface.

15. The non-transitory computer-readable medium of claim 12, wherein the one or more instructions, that cause the one or more processors to automatically implement the recommendation, cause the one or more processors to:

determine a construction resource utilization for the point-to-point hub-and-spoke architecture network; and
automatically distribute resources in proportion to a priority of candidate segments to be built based on the construction resource utilization and the prioritization.

16. A method, comprising:

obtaining, by a device, incomplete geospatial coordinate data associated with a telecommunications network,
wherein the incomplete geospatial coordinate data includes first data identifying candidate segments of the telecommunications network and second data identifying candidate sites of the telecommunications network;

generating, by the device, a network graph representation of the telecommunications network based on the incomplete geospatial coordinate data, wherein the network graph representation includes edges corresponding to the candidate segments and nodes corresponding to the candidate sites, and wherein generating the network graph representation of the telecommunications network comprises:

defining a neighborhood around a candidate segment end, corresponding to a candidate segment of the candidate segments, that is parametrized based on a segment length of the candidate segment, and selectively connecting a candidate splice to the candidate segment based on a location of the candidate splice with respect to the neighborhood and based on a set of candidate site constraints, wherein the candidate splice is an existing candidate splice or a newly created candidate splice;

determining, by the device, a prioritization of the candidate segments for traversal of the network graph representation based on a parametrized objective function;

generating, by the device, a recommendation for selecting or ordering the candidate segments based on the prioritization of the candidate segments; and communicating, by the device, with one or more other devices to perform one or more response actions to implement the recommendation.

17. The method of claim 16, wherein the telecommunications network is a point-to-point hub-and-spoke branching network.

18. The method of claim 16, wherein the incomplete geospatial coordinate data includes at least one of:
a location of a candidate site,
a type of the candidate site,
a location of a hub,
a type of the hub,
a location of a candidate segment, or
a quantity of fibers in a candidate segment.

19. A device, comprising:
a memory; and
one or more processors operatively coupled to the memory, the memory and the one or more processors configured to:
obtain incomplete geospatial coordinate data associated with a telecommunications network,
wherein the incomplete geospatial coordinate data includes first data identifying candidate segments of the telecommunications network, second data identifying candidate sites of the telecommunications network, and third data identifying candidate hubs of the telecommunications network;
generate a network graph representation of the telecommunications network based on the incomplete geospatial coordinate data,
wherein the network graph representation includes edges corresponding to the candidate segments, a first set of nodes corresponding to the candidate sites and a second set of nodes corresponding to the candidate hubs, and
wherein the one or more processors, when generating the network graph representation of the telecommunications network, are configured to:
define a neighborhood around a candidate segment end, corresponding to a candidate segment of the candidate segments, that is parametrized based on a segment length of the candidate segment, and
selectively connect a candidate splice to the candidate segment based on a location of the candidate splice with respect to the neighborhood and based on a set of candidate site constraints,
wherein the candidate splice is an existing candidate splice or a newly created candidate splice;
determine, for each candidate site, a candidate site score based on a quantity of candidate segments to connect the candidate site to a candidate hub;
determine, for each candidate segment, a candidate segment score based on a quantity of the candidate sites that connect to a candidate hub via the candidate segment;
determine a prioritization of the candidate segments for traversal of the network graph representation based on the candidate site scores and the candidate segment scores;
generate a recommendation for selecting or ordering the candidate segments based on the prioritization of the candidate segments; and
provide the recommendation for display via a user interface.

20. A device, comprising:
a memory; and
one or more processors operatively coupled to the memory, the memory and the one or more processors configured to:
obtain incomplete geospatial coordinate data associated with a telecommunications network,
wherein the incomplete geospatial coordinate data includes first data identifying candidate segments of the telecommunications network, second data identifying candidate sites of the telecommunications network, and third data identifying candidate hubs of the telecommunications network;
generate a network graph representation of the telecommunications network based on the incomplete geospatial coordinate data,
wherein the network graph representation includes edges corresponding to the candidate segments, a first set of nodes corresponding to the candidate sites and a second set of nodes corresponding to the candidate hubs, and
wherein the one or more processors, when generating the network graph representation of the telecommunications network, are configured to:
identify one or more disconnected nodes of the first set of nodes,
define one or more neighborhoods around the one or more disconnected nodes, and
connect the one or more disconnected nodes to one or more closest splices within the one or more neighborhoods based on proximity in the neighborhood and a set of constraints relating to network topology and connectivity logic;
determine, for each candidate site, a candidate site score based on a quantity of candidate segments to connect the candidate site to a candidate hub;
determine, for each candidate segment, a candidate segment score based on a quantity of the candidate sites that connect to a candidate hub via the candidate segment;

determine a prioritization of the candidate segments for traversal of the network graph representation based on the candidate site scores and the candidate segment scores;

generate a recommendation for selecting or ordering the candidate segments based on the prioritization of the candidate segments; and provide the recommendation for display via a user interface.

21. A device, comprising:

a memory; and one or more processors operatively coupled to the memory, the memory and the one or more processors configured to:

obtain incomplete geospatial coordinate data associated with a telecommunications network,
wherein the incomplete geospatial coordinate data includes first data identifying candidate segments of the telecommunications network, second data identifying candidate sites of the telecommunications network, and third data identifying candidate hubs of the telecommunications network;

generate a network graph representation of the telecommunications network based on the incomplete geospatial coordinate data,
wherein the network graph representation includes edges corresponding to the candidate segments, a first set of nodes corresponding to the candidate sites and a second set of nodes corresponding to the candidate hubs, and
wherein the one or more processors, when generating the network graph representation of the telecommunications network, are configured to:
generate a directed graph based on the incomplete geospatial coordinate data,
search the directed graph to identify one or more orphan roots that do not correspond to the candidate sites, and
connect the one or more orphan roots to one or more closest nodes, of the directed graph, that correspond to a candidate site of the candidate sites in accordance with a set of constraints;

determine, for each candidate site, a candidate site score based on a quantity of candidate segments to connect the candidate site to a candidate hub;

determine, for each candidate segment, a candidate segment score based on a quantity of the candidate sites that connect to a candidate hub via the candidate segment;

determine a prioritization of the candidate segments for traversal of the network graph representation based on the candidate site scores and the candidate segment scores;

generate a recommendation for selecting or ordering the candidate segments based on the prioritization of the candidate segments; and provide the recommendation for display via a user interface.

22. A device, comprising:

a memory; and one or more processors operatively coupled to the memory, the memory and the one or more processors configured to:

obtain incomplete geospatial coordinate data associated with a telecommunications network,
wherein the incomplete geospatial coordinate data includes first data identifying candidate segments of the telecommunications network, second data identifying candidate sites of the telecommunications network, and third data identifying candidate hubs of the telecommunications network;

generate a network graph representation of the telecommunications network based on the incomplete geospatial coordinate data,
wherein the network graph representation includes edges corresponding to the candidate segments, a first set of nodes corresponding to the candidate sites and a second set of nodes corresponding to the candidate hubs, and
wherein the one or more processors, when generating the network graph representation of the telecommunications network, are configured to:
propose, using a machine learning model of telecommunications networks, one or more new candidate segments, candidate sites, or candidate hubs not identified in the incomplete geospatial coordinate data, and
add the one or more new candidate segments, the candidate sites, or the candidate hubs to the network graph representation of the telecommunications network;

determine, for each candidate site, a candidate site score based on a quantity of candidate segments to connect the candidate site to a candidate hub;

determine, for each candidate segment, a candidate segment score based on a quantity of the candidate sites that connect to a candidate hub via the candidate segment;

determine a prioritization of the candidate segments for traversal of the network graph representation based on the candidate site scores and the candidate segment scores;

generate a recommendation for selecting or ordering the candidate segments based on the prioritization of the candidate segments; and provide the recommendation for display via a user interface.

23. A non-transitory computer-readable medium storing one or more instructions, the one or more instructions comprising:

one or more instructions that, when executed by one or more processors of a device, cause the one or more processors to:

obtain network connection data associated with a point-to-point hub-and-spoke architecture network,
wherein the network connection data includes first data identifying candidate segments of the point-to-point hub-and-spoke architecture network and second data identifying candidate sites of the point-to-point hub-and-spoke architecture network;

generate a network graph representation of the point-to-point hub-and-spoke architecture network based on the network connection data,
wherein the network graph representation includes edges corresponding to the candidate segments and nodes corresponding to the candidate sites;

assign candidate site scores to the candidate sites based on a quantity of candidate segments associated with the candidate sites;

assign, for each candidate segment, a segment score based on a quantity of the candidate sites associated with the candidate segment; and determine a prioritization based on the candidate site scores and the segment scores,
  wherein the one or more instructions, that cause the one or more processors to determine the prioritization, cause the one or more processors to:
    create, for a tree of the network graph representation, a depth-first search list of network entities,
    calculate entity costs of the network entities using a forward pass of the depth-first search list,
    traverse, using a reversed of the depth-first search list, network edges,
      wherein the one or more instructions, that cause the one or more processors to traverse the network edges, cause the one or more processors to:
        determine value vectors for the network edges, and
        determine cost vectors for the network edges; and
      determine the prioritization based on the value vectors, the cost vectors, and the entity costs;
generate a recommendation for selecting or ordering the candidate segments based on the prioritization; and
provide the recommendation for display via a user interface.

24. A non-transitory computer-readable medium storing one or more instructions, the one or more instructions comprising:
one or more instructions that, when executed by one or more processors of a device, cause the one or more processors to:
  obtain network connection data associated with a point-to-point hub-and-spoke architecture network,
    wherein the network connection data includes first data identifying candidate segments of the point-to-point hub-and-spoke architecture network and second data identifying candidate sites of the point-to-point hub-and-spoke architecture network;
  generate a network graph representation of the point-to-point hub-and-spoke architecture network based on the network connection data,
    wherein the network graph representation includes edges corresponding to the candidate segments and nodes corresponding to the candidate sites;
  assign candidate site scores to the candidate sites based on a quantity of candidate segments associated with the candidate sites;
  assign, for each candidate segment, a segment score based on a quantity of the candidate sites associated with the candidate segment; and
  determine a prioritization based on the candidate site scores and the segment scores;
  generate a recommendation for selecting or ordering the candidate segments based on the prioritization; and
  provide the recommendation for display via a user interface; and
  automatically implement the recommendation,
    wherein the one or more instructions, that cause the one or more processors to automatically implement the recommendation, cause the one or more processors to:
      generate a construction schedule for the point-to-point hub-and-spoke architecture network based on the recommendation, and
      communicate with a plurality of client devices to distribute the construction schedule.

25. A non-transitory computer-readable medium storing one or more instructions, the one or more instructions comprising:
one or more instructions that, when executed by one or more processors of a device, cause the one or more processors to:
  obtain network connection data associated with a point-to-point hub-and-spoke architecture network,
    wherein the network connection data includes first data identifying candidate segments of the point-to-point hub-and-spoke architecture network and second data identifying candidate sites of the point-to-point hub-and-spoke architecture network;
  generate a network graph representation of the point-to-point hub-and-spoke architecture network based on the network connection data,
    wherein the network graph representation includes edges corresponding to the candidate segments and nodes corresponding to the candidate sites;
  assign candidate site scores to the candidate sites based on a quantity of candidate segments associated with the candidate sites;
  assign, for each candidate segment, a segment score based on a quantity of the candidate sites associated with the candidate segment; and
  determine a prioritization based on the candidate site scores and the segment scores;
  generate a recommendation for selecting or ordering the candidate segments based on the prioritization; and
  provide the recommendation for display via a user interface; and
  automatically implement the recommendation,
    wherein the one or more instructions, that cause the one or more processors to automatically implement the recommendation, cause the one or more processors to:
      determine a construction resource utilization for the point-to-point hub-and-spoke architecture network, and
      automatically distribute resources in proportion to a priority of candidate segments to be built based on the construction resource utilization and the prioritization.

* * * * *